(12) United States Patent
Smith

(10) Patent No.: US 12,008,550 B2
(45) Date of Patent: Jun. 11, 2024

(54) POST-PROVISIONING AUTHENTICATION PROTOCOLS

(71) Applicant: Capital One Services, LLC, McLean, VA (US)

(72) Inventor: Erin Stacy Smith, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 221 days.

(21) Appl. No.: 16/849,623

(22) Filed: Apr. 15, 2020

(65) Prior Publication Data

US 2021/0326858 A1 Oct. 21, 2021

(51) Int. Cl.
G06Q 20/36 (2012.01)
G06F 21/35 (2013.01)
G06F 21/44 (2013.01)
G06Q 20/32 (2012.01)

(52) U.S. Cl.
CPC ......... G06Q 20/3674 (2013.01); G06F 21/35 (2013.01); G06F 21/44 (2013.01); G06Q 20/3227 (2013.01); G06Q 20/3672 (2013.01)

(58) Field of Classification Search
USPC .......................................................... 705/67
See application file for complete search history.

(56) References Cited

U.S. PATENT DOCUMENTS

| | | |
|---|---|---|
| 8,090,648 B2 | 1/2012 | Zoldi et al. |
| 9,203,962 B2 | 12/2015 | Guerra et al. |
| 9,769,161 B2 | 9/2017 | Davis et al. |
| 2006/0265340 A1* | 11/2006 | Ziv .......................... G06F 21/34 705/76 |
| 2008/0040276 A1* | 2/2008 | Hammad ............. G06Q 20/367 705/44 |
| 2013/0041817 A1 | 2/2013 | Greenwald et al. |
| 2014/0136346 A1* | 5/2014 | Teso ....................... G06Q 30/06 705/14.72 |

(Continued)

FOREIGN PATENT DOCUMENTS

CA 3000493 A1 * 10/2019 ......... G06Q 20/3224

OTHER PUBLICATIONS

Fonte, Luís Manuel Pereira da, "Host Card Emulation with Tokenisation: Security Risk Assessments", PQDT—GlobalProQuest Dissertations Publishing. (2019) (Year: 2019).*

Primary Examiner — Neha Patel
Assistant Examiner — Clay Lee
(74) Attorney, Agent, or Firm — Banner & Witcoff, Ltd.

(57) ABSTRACT

More effective authentication protocols for provisioning electronic devices are provided. An approval signal responsive to a provisioning request may be transmitted in real-time, such as under four seconds in certain embodiments. An authentication score for the provisioning request may be calculated even after transmitting the approval signal. In certain embodiments, information gathered from the successful provisioning of a device can be used in the authentication scoring process. Authentication scores deemed to fall below a requisite threshold may be used to suspend the provisioned device, therefore, limit the ability for the device to utilize the account, however, without withdrawing the approval or granted digital token. Certain implementations may negate the need to transmit further approvals or confirmations following determining an authentication score met a threshold.

20 Claims, 4 Drawing Sheets

(56) References Cited

U.S. PATENT DOCUMENTS

| | | | |
|---|---|---|---|
| 2015/0066768 A1* | 3/2015 | Williamson | G06Q 20/405 |
| | | | 705/44 |
| 2015/0088756 A1 | 3/2015 | Makhotin et al. | |
| 2015/0127547 A1* | 5/2015 | Powell | G06Q 20/382 |
| | | | 705/67 |
| 2017/0295155 A1* | 10/2017 | Wong | H04L 67/306 |
| 2018/0025148 A1* | 1/2018 | Jain | G06F 21/35 |
| | | | 713/166 |

* cited by examiner

POST-PROVISIONING AUTHENTICATION PROTOCOLS

FIELD OF USE

Aspects of the disclosure generally relate to authentication protocols. More specifically, aspects of the disclosure provide more effective authentication protocols and procedures that may be implemented to approve legitimate requests to provision electronic devices so that they may properly utilize user accounts for tokenized transactions in a user-friendly manner.

BACKGROUND

Electronic user accounts, whether for work, pleasure, financial, educational, and/or other reasons, have become ubiquitous throughout the world. As electronic accounts have become the norm, users increasingly desire to remove physical barriers, such as membership cards, keys, or even financial instruments. Electronic devices are now being used in place of cash, credit cards, membership cards, keys or other physical limitations. To accomplish this, institutions often need to provision electronic devices to enable them to conduct tokenized transactions with the desired user accounts.

Authentication procedures and protocols have been established to deter nefarious actors who wish to obtain unauthorized access to such accounts. Unfortunately, existing protocols and procedures oftentimes do not allocate sufficient time and/or resources to perform adequate authentication screening. This is especially true for valuable user accounts in which hackers have become increasingly skilled in mimicking the identity of other users' devices. To complicate matters, stringent time requirements for approval impose a great responsibility on the entities who serve as the guardian or operator of the user's accounts. Generally, the stringent requirements are due to one or more factors, such as for example, consumer expectation, requirements of one or more electronic communication pathways/security protocols being utilized, and/or safeguards to ensure privacy and safeguarding data.

Modern consumers have become accustomed to real time experiences when requesting information on their device. Therefore, failure to provide an immediate response results in many users believing erroneously their device or an internet connection is unresponsive. Oftentimes, this results in users resubmitting requests (causing in double requests), resetting the phone or internet connection (resulting in incomplete requests or not receiving the necessary data), among other potential problems. To complicate matters, individuals improperly accessing user accounts have cloned the identity of another user's electronic device, such as, but not limited to, stealing a SIM card and/or activating a new copy of the existing SIM card. As a result, conducting an accurate assessment of authenticity of the request using communications to the device through certain communication paths may be thwarted by being transmitted to the cloned or unauthorized device. More complete checks often result in the provisioning request being timed out or otherwise not achievable within the available time frame. Depending on the account type, this may lead to reduced profitability, lost profits and/or other problems, like user's ceasing to use the account. Further, because an authentication process that was initiated but is not usable within the decision time frame before the absence of an approval is deemed a rejection, existing processes result in wasted computing power collecting and analyzing data that is not fully utilized and may have to then be stored or discarded within existing legal frameworks.

Aspects described herein may address these and other problems, and generally improve the quality, efficiency, and/or accuracy of provisioning requests by offering improved procedures and protocols.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein relate to computerized systems and methods that may be used to authenticate a user's electronic device, such as a mobile telephone. In one embodiment, a provisioning server may receive a provisioning request seeking approval to provision the user's device to enable the user device to conduct tokenized transactions with one or more of their accounts. In accordance with one novel implementation, an approval signal may be transmitted in real-time in response to receiving the request. The approval signal may be transmitted in under 4 seconds in various embodiments. The approval signal may be configured to authorize a third party to issue a digital token to the user's device authorizing it to digitally utilize the first user account for tokenized transactions. In one implementation, an authentication score for the provisioning request may be initiated even after the approval signal has been transmitted. In another embodiment, the determination of an authentication score may be initiated prior to the approval signal, however, the approval signal is transmitted in real-time without regard to the status of the authentication scoring process.

An authentication score may be determined through several different processes. In one implementation, an origin identifier ("origin ID") of the user's device may be utilized. The origin ID may relate to the device's location of manufacture. Examples include geographic and/or corporate entity identifiers as an origin ID and/or to derive an origin ID. In one embodiment, the origin ID may be utilized in conjunction with other factors, such as being compared to a location identifier ("location ID") of the user. The location ID may be derived from a source other than the device sought to be provisioned. The location ID may purposely not be the user's exact current location, but instead a permanent or registered address or location may be used. Yet in other implementations, a current location may be utilized. Further embodiments may determine whether the user has previously accessed an umbrella user account. As used herein, an umbrella account is an account that once credentials are provided, allows authorized access to one or more accounts, including the account for which provisioning is being sought. Umbrella accounts are discussed more fully within specific examples disclosed herein. Specific parameters relating to prior accesses of the user account may be utilized in determining the authentication score. Transactions conducted on the user device after transmitting the initial approval signal may be utilized in certain embodiments. In one implementation, the post-approval transactions may be compared with transactions conducted prior to the provisioning request on at least one other device.

In one embodiment, if an authentication score fails to meet a threshold requirement, an electronic suspend message may be transmitted. In one implementation, the suspend message may be configured to provide instructions to limit utilization of the digital token on the first user device, however, without actually withdrawing the digital token. Further aspects relate to using a calculated authentication score for later-received provisioning requests, including but not limited to for the same device (but with a different user account) and/or a different device (but the same or different user account(s)).

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein relate to authenticating an electronic device to conduct tokenized transactions. For example, a user of an electronic device, such as a mobile telephonic device, may desire to utilize their device to provide credentials for one or more accounts without necessitating a physical membership or account card or physical credentials. Accounts may include, but are not limited to, membership accounts, work or business accounts, financial accounts, and combinations thereof. Such devices must be properly provisioned, often from a remote server. Before discussing these concepts in greater detail, however, several examples of such computing devices that may be used in implementing and/or otherwise providing various aspects of the disclosure will first be discussed with respect to FIG. 1.

Figure 1:
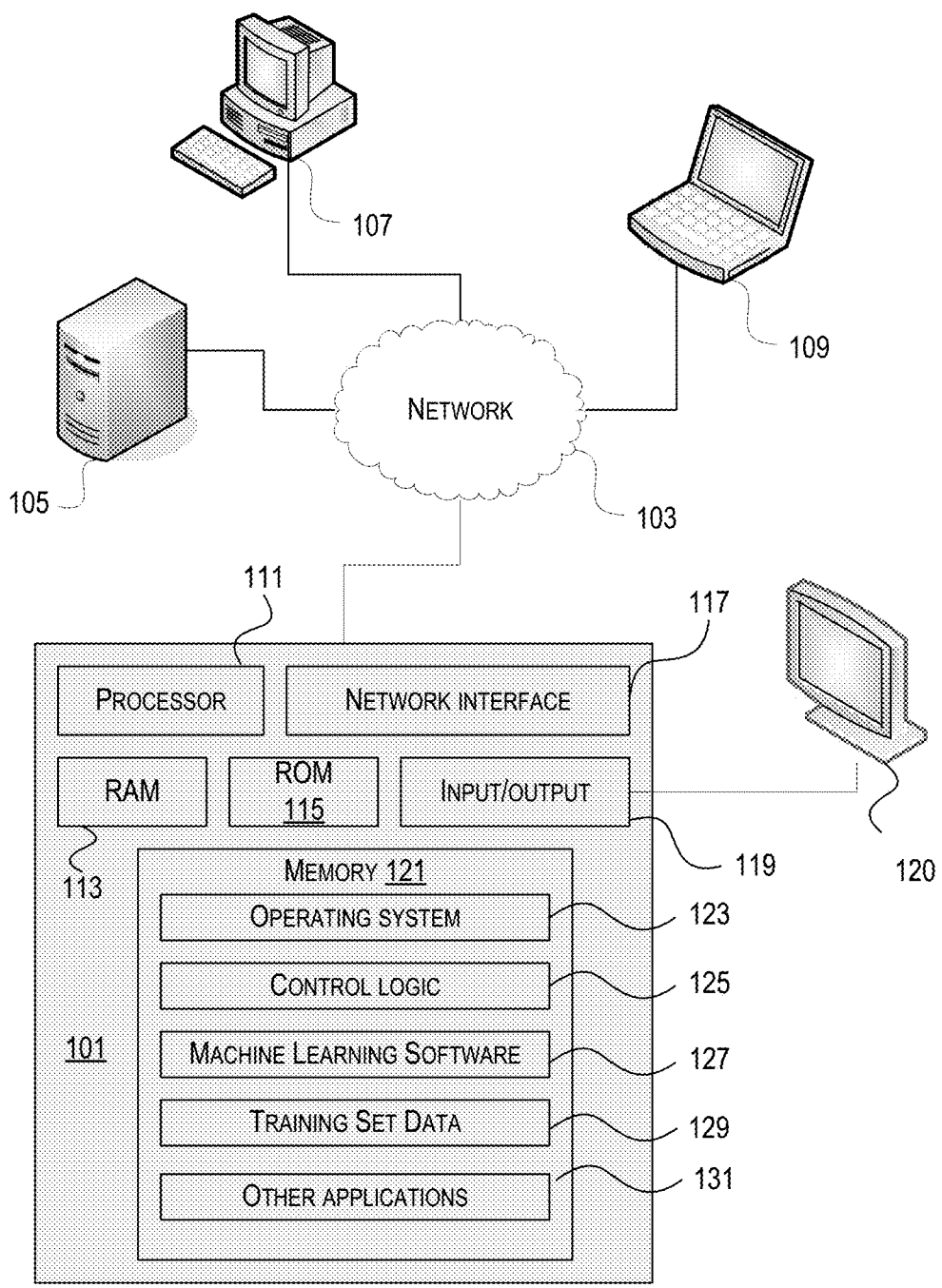
FIG. 1 depicts an example of a computing device that may be used in implementing one or more aspects of the disclosure in accordance with one or more illustrative aspects discussed herein.

FIG. 1 illustrates one example of a computing device 101 that may be used to implement one or more illustrative aspects discussed herein. For example, computing device 101 may, in some embodiments, implement one or more aspects of the disclosure by reading and/or executing computer-executable instructions and performing one or more actions based on the instructions. Computing device 101 may be one of a plurality of user devices that one or more users has access to. In some embodiments, computing device 101 may represent, be incorporated in, and/or include various user devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topologies and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, and other applications 129. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125.

In one embodiment, device 105 may comprise a provisioning server. As explained in more detail within this disclosure, one or more provisional servers may receive provisioning requests to provision an electronic device (such as, for example, device 100) to conduct tokenized transactions with at least one account. In one embodiment, one or more devices, such as device 107, may serve as an intermediary device. For example, a provisioning request received at provisional server (of, e.g., device 105) may be transmitted from an intermediary device. Further examples are provided within the context of FIGS. 2-4.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
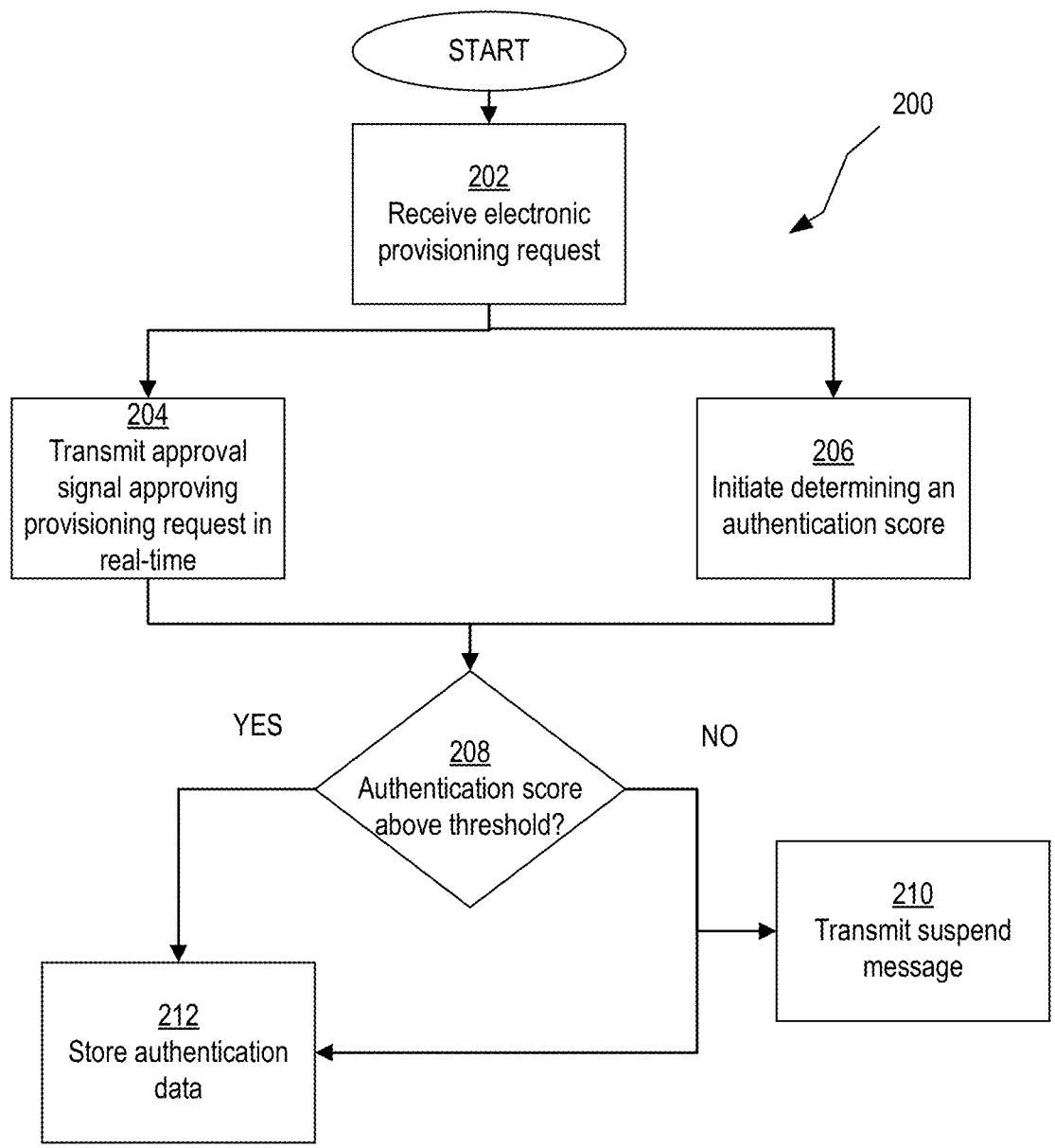
FIG. 2 a flow chart depicting an example authentication protocol according to one or more aspects of the disclosure.

Having discussed several examples of computing devices which may be used to implement some aspects as discussed further below, discussion will now turn to example embodiments of improved authentication procedures and protocols for provisioning electronic devices FIG. 2 shows flowchart 200 which may be utilized (in whole or in part) to authorize an electronic device to conduct tokenized transactions in accordance with one embodiment.

As shown in FIG. 2, an electronic provisioning request may be received (see, e.g., block 202). The provisioning request may request authorization to provision a specific device for tokenized transactions using a user account associated with a user. For example, if the user account is a financial account, such as a credit, savings, or checking account, the user may desire to obtain a digital token to utilize the phone (such as through a wireless technology, such as but not limited to, RFID or Bluetooth™) in making one or more transactions with the account. In one embodiment, device 100 of FIG. 1 is a user device for which provisioning is being requested for. In accordance with one embodiment, a processing institution may initiate or transmit a provisioning request to the institution responsible for the account. As one example, computing device 107 may comprise an intermediary server configured to transmit provisioning requests to a provisioning server, such as part of device 105. In one embodiment of a provisioning request for a user device with a financial account, a processing institution or intermediary (such as for example, but not limited to, VISA™, MASTERCARD™, DISCOVER™, or AMERICAN EXPRESS™) may transmit a provisioning request (such as from a server of device 107) to the institution responsible for the account (e.g., the bank that issued the credit, savings, or checking account), which may be received at a provisioning server of device 105. The provisioning request may be in response to a first entity receiving a request from the user of a device, such as device 100, to provision the device. A provisioning request transmitted by an intermediary may be transmitted to a server or other computing device managed or otherwise controlled by an entity who issued credentials to the user account. For example, in terms of a work-related account, an intermediary may transmit the request to a computing device operated by the organization employing the owner of the user device. This disclosure is not limited to a specific type of account and any account associated with at least one user and managed by credentials is within the scope of this disclosure. Further, although certain examples will be explained in terms of using an intermediary or processing institution, those skilled in the art will readily appreciate that a request may be directly received without utilizing an intermediary. In one embodiment, a provisioning request may be directly received from a user of the user device.

In some authentication protocols, provisioning requests (such as a request received as part of block 202) must be approved within in a short time frame, oftentimes within only a few seconds. Failing to provide an immediate response may result in an improper denial of a legitimate user and/or the user believing the account administrator or another party was unresponsive. In accordance with one embodiment, an electronic signal providing approval of the provisioning request may be transmitted (see, e.g., block 204). In one embodiment, the signal, which may also be referred herein as an approval signal, may be configured to authorize a third party to provide authorization (e.g., issue a digital token) to the requesting device. The digital token may be configured to authorize the first user device to utilize the first user account for tokenized transactions. In one embodiment, the approval signal may be transmitted prior to conducting any additional confirmations and/or authorizations (e.g., confirmations or authorizations aside from what an intermediary may have conducted on their own behalf) with respect to at least one of the first user device, the first user account, or the known or presumed user of the first device or account. In another implementation, the approval signal may be transmitted prior to an outcome of determining whether the user device is authentic and/or whether authorizing the user device is, in-fact, proper. Transmission of the approval signal grants authorization to provision the device, therefore, certain embodiments disclosed herein utilize information received as a result of provisioning the device in determining an authentication score. In some examples, at least a portion of the information received as a result would otherwise not be obtainable, either due to not having access to the information or not having access within a time frame that allows it to be utilized in an adequately meaningful manner.

In one embodiment, only confirmations relating to the existence of the user account is conducted by devices operated or controlled by the account owner or operator prior to transmitting an approval signal. In another embodiment, no confirmations or authorizations are conducted in real-time by the account operator or owner (although may be by an intermediary not under control of the account owner or operator) prior to transmitting approval to the provisioning request. In certain implementations, the approval signal may be transmitted in real-time. In this regard, it is understood that different communication paths may have different latencies, delays, and transit times, however, a person of ordinary skill in the art will appreciate that such factors are inherent in communication pathways. In some embodiments, a real-time signal may experience such different latencies, delays, and transit times. For example, the electronic signal providing approval of block 204 may be transmitted in less than 5 seconds from when the provisioning was received at the final destination and could be acted upon. In another example, an approval signal may be transmitted in less than 4 seconds from when the provisioning request was first received.

Further aspects of the disclosure relate to determining an authentication score (e.g., block 206 of FIG. 2). In accordance with one embodiment, the determination of an authentication score may be initiated upon receiving the provisioning request (see, e.g., the request of block 202). Authentication scores (and related computations) may occur in one or more computing devices having a computer-readable medium and a processor. In one embodiment, a provisioning server of computing device 105 calculates at least a portion of the calculations utilized in determining an authentication score. Determining an authentication score may be initiated upon receiving the provisioning request despite not being utilized to approve at least one request (such as, for example, the approval signal transmitted as described above with respect to block 204). In another embodiment, determining an authentication score may be initiated responsive to providing approval of a provisioning request (e.g., such as the approval signal described with respect to block 204). In one implementation, determining an authentication score (e.g., such as part of block 206) may occur following approval of the provisioning request (e.g., block 204). In some instances, determining an authentication score may not be initiated or otherwise directly triggered by transmission of the approval signal. An authentication score may be determined in a variety of different ways in accordance to various embodiments of this disclosure, including but not limited to FIGS. 3 and 4.

Figure 3:
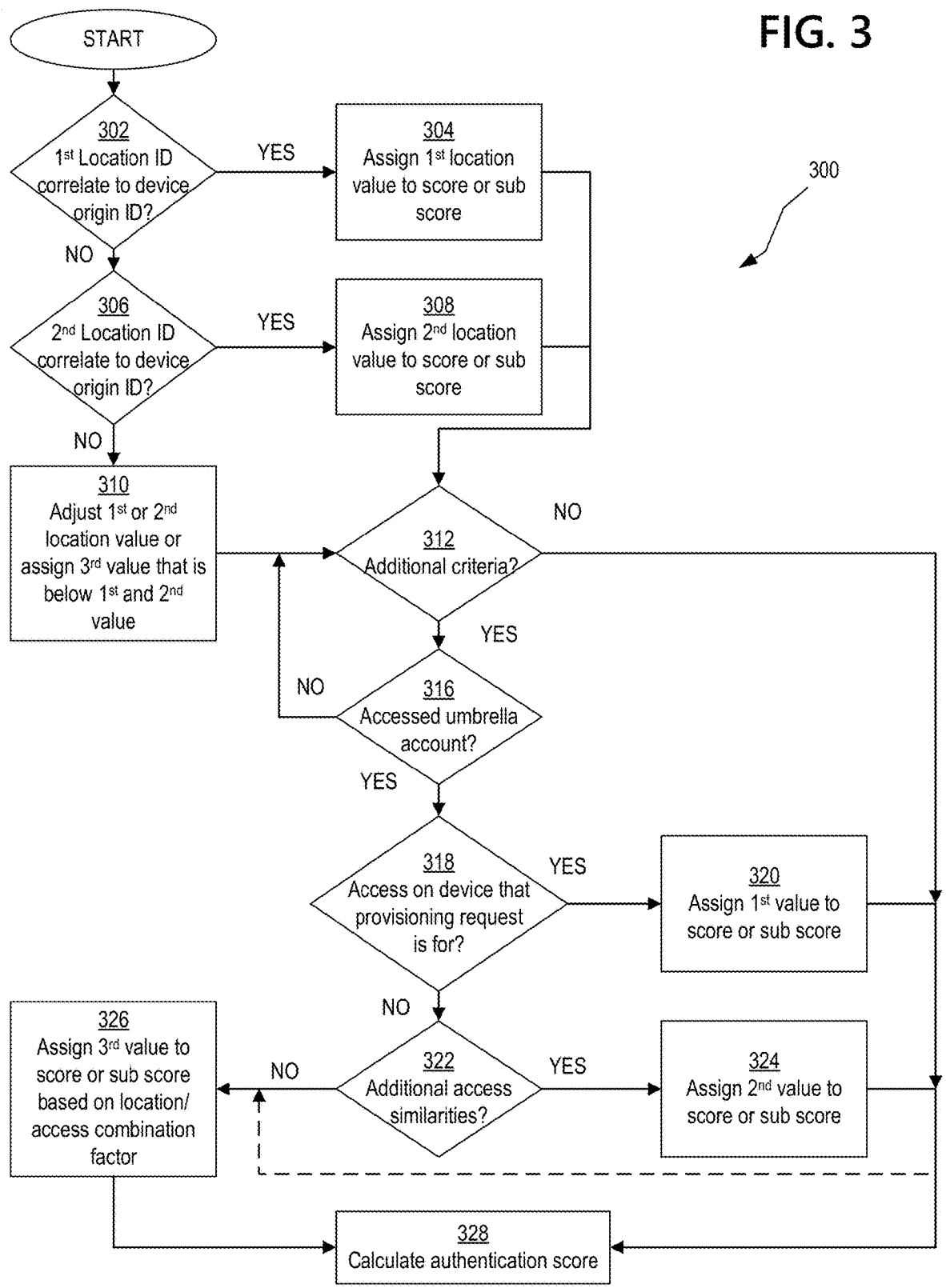
FIG. 3 is a flowchart depicting an example calculation of an authentication score according to one or more aspects of the disclosure.

As shown in FIG. 3, flowchart 300 depicts an example method for determining an authentication score. The example method should not be limited to the specific order or sequence depicted. Further, one or more components shown in FIG. 3 may be omitted (as well as additional components introduced) without departing from the scope of this innovative disclosure. As part of determining an authentication score (e.g., such as part of flowchart 300), it may be determined whether a location identifier of the user ("location ID") is correlated to an origin identifier ("origin ID") of the device for which provisioning is being requested for (see, e.g., decision 302).

In one embodiment, the origin ID relates to the device's origin of manufacture. The origin ID may be derived or based on the manufacturer/distributor of the device. For example, despite multi-national corporations offering a specific model or device throughout several different countries or regions throughout the world, oftentimes subsidiaries or related business entities manufacture the device for different regions. For example, if Corporation A offers a CS6 model electronic device globally, Corporation A of Europe may be the manufacturer/distributor of the device in Europe while Corporation A of the Americas may be the manufacturer/distributor of the same device in South, Central, and North America. In yet another example, a different legal or business entity may operate in North America while a separate related entity may handle the distribution in South America. In this regard, a first origin ID may identify the entity that manufactures devices intended to be distributed in a first region or country and a second origin ID may identify another entity that manufactures substantially the same device that are intended to be distributed in another part of the world, which may partially overlap the first region or country or may be entirely distinct and not overlap.

In yet another embodiment, the manufacturer or distributor of software on the user device may be used, either alone or in part, for determining or obtaining an origin ID. In one embodiment, the operating system of the user device (or version thereof) may be used in determining the origin ID. In another embodiments, software, such as an app or program made available by or through the entity making the authenticity determination and/or the organization responsible for the user account may be utilized. In one implementation, a combination of hardware and software types or versions may be used in the determination or obtaining of the origin ID. For example, a media access control (MAC) address of a device, International Mobile Equipment Identity (IMEI) of the device, or some other identifier, may be used to identify manufacturing characteristics of the device (e.g., location of manufacture, manufacturer, a model or version distributed in a certain area, etc.).

As part of determining if the origin ID is correlated to a location ID (e.g., decision 302), one or more location identifiers of the user may be utilized. In one embodiment, the user's current location when the provisioning request is received may be used. The location may be directly determined, such as through GPS coordinates and/or triangulation of signals when receiving the authorization request, and/or may be indirectly determined, such as determining which communication pathways, servers, or intermediary devices were utilized by the user in seeking authorization. As modern day consumers travel for both pleasure and business, it may be advantageous to use locations other than a current location in order to determine where a user resides normally. In certain embodiments, the location ID of the user is independent of the current location of the user (at least with respect to the location of the user, and/or the user device, at the time the provision request is received). In certain embodiments, the current location of the user when the provisioning request is made is intentionally not utilized.

In one embodiment, the permanent address and/or billing address of the user account sought to be provisioned may be used. This may yield more accurate determinations, for example, if a US-based consumer with a device having an origin ID designated as being distributed in North America is seeking provisioning of the account when they are traveling, such as in Europe or Asia. In one such embodiment, if it is determined that the origin ID is correlated to a location ID of the user (e.g., the device's origin ID designates a North American distributor and the user's permanent address is located in North America), then a first locational value may be factored into the score or sub score (e.g., see block 304).

One or more additional locational values may be considered as part of an authorization process (including, but not limited to the examples depicted flowchart 300). As one example, it may be determined whether a second location ID is correlated to the origin ID (e.g., decision 306). Thus, other location identifiers may be used, either alone or in combination with other IDs (e.g., the one or more location IDs of decision 302 or other location IDs). In one embodiment, the location values (or other values disclosed herein) may not be static, but rather assigned amongst a range of values, such that determining a high correlation exists (e.g., such as at decision 302), may result in a first location value being assigned (such as block 304), which may be "higher" or otherwise more favorable then if less correlation existed. Further, different location IDs (or other criteria) may be weighted differently or otherwise not be deemed equal. In one such embodiment, if it is determined that a secondary location ID (for example, current location of the user device) is correlated to the origin ID (e.g., at decision 306), a "lower" or less favorable score or sub score may be assigned (such as at block 308) relative to the score assigned to another location ID (e.g., the first location value assigned at block 304). Although an example embodiment provides a "more favorable" range of values for the user's permanent or registered address than their current location, those skilled in the art will appreciate that it may be preferable in some instances to provide a more favorable score (or sub-score) to the correlation of the device ID to the current location as opposed to a permanent address of the user or an account assigned to the user.

Correlations between two values (such as between a device's origin ID and a location ID) may be utilized in a cumulative manner. For example, both decisions 302 and 306 (and/or others) may be implemented regardless of the determination at each of them independently. For example, if a threshold correlation is determined to exist at a first determination, the second determination is conducted regardless of the outcome and the determinations are both used together in a location score or sub score (e.g., the scores of blocks 304 and 308 may both be considered). It is also to be understood that one or more determinations may be conducted in parallel and/or in an overlapping manner such as one does not need to be initiated or concluded prior to determining to initiate or conclude the other.

In another embodiment, virtual addresses may be utilized, either alone or in combination, with other location identifiers. In one example, an Internet Protocol address of a device may indicate a location of a user. In another example, decision(s) 302 and/or 306 may incorporate a consumer's email address to determine if the user has a European or Asian based virtual address, and whether that correlates to the origin ID of the user device sought to be provisioned (this may be beneficial, as an email address may be more closely tied with a permanent place of residence than an Internet Protocol address, which may be spoofed). Those of ordinary skill in the art will appreciate that these are mere examples, and that other virtual addresses or accounts may be utilized without departing from the score of this disclosure. Those of ordinary skill in the art will also appreciate that decisions 302 and 306 may be fewer or additional decisions. For example, decision 302 may encompass the disclosure relating to decision 306 and/or other disclosures herein. Yet in other embodiments, additional determinations are made with respect to the origin ID. Further, the disclosure provided herein for examples at decision 302 may be incorporated within decision 306 and vice-versa.

In one embodiment, if it is determined that the location ID is not correlated to the origin ID, a location score or sub score may be assigned that is "lower" or otherwise less desirable (e.g., indicative of more risk) than scores or sub scores assigned if at least one location ID was deemed correlated to the origin ID (e.g., block 310). In certain implementations, despite receiving the lower or less desirable score, it would not directly result in a "failing" authentication score.

Following determinations of at least one score or sub score based on the correlation with the device's origin ID, certain embodiment may be implemented to determine whether to consider additional criteria (e.g., decision 312). The determination whether to consider additional criteria may be based on one or more scores or sub scores calculated. Further, in certain embodiments, a determination whether to conduct additional criteria may be conducted prior to determining an origin ID (e.g., the origin ID is not the first criterion considered). Certain embodiments may further exclude considerations of an origin ID. Although not expressly shown in FIG. 3, other criteria may include but is not limited to the manner the user account information was provided in the provisioning request, such as whether it was manually entered, digitally captured, obtained from an authorized app or device, confirmed by a third-party source, amongst others.

In one embodiment, if it is determined that the device's origin ID is not correlated to any (or a requisite amount) of location IDs, further analysis may not be required. A determination or indication that further analysis is not required (e.g., due to any number of reasons such as for example, due to criteria not being met or a determination that certain values have been calculated or are known) may prompt a determination whether a score meets a threshold (e.g., see block 328, discussed below)

Determinations of an authentication score or sub score may consider whether the user and/or a user device has previously accessed an umbrella account (See, e.g., decisions 316 and 318). For example, commercial, financial, and non-profit agencies alike often allow users to access account information via one or more programs. The umbrella account may relate to financial resources (e.g., banking, credit or investment accounts), performance (e.g., educational institutions providing confidential information, such as grades), member-specific benefits (e.g., access to certain documentation and perks) amongst other types of accounts. Oftentimes, entities offer mobile or operating system-specific applications ("apps") that assist users in retrieving information (and possibly conducting transactions) with one or more related accounts. For example, a mobile banking app may allow a user to provide credentials to access account information on one or more accounts, such as relating to savings, checking, investments and/or credit accounts. Thus, in one embodiment, the umbrella account may be accessed via a single user sign-on to an app (or designated virtual address), in which once credentials have been verified, the user is provided information with respect to multiple accounts including at least the account for which the digital token is being requested for.

In accordance with one embodiment, it may be determined whether the user has previously accessed an umbrella account. Depending on the implementation, a determination that a user previously accessed an umbrella account (e.g., such as at decision 316) may consider whether the access was conducted within a certain time frame, within a certain region, and/or other factors. The determination may consider if the user accessed the umbrella account with a specific app or specific version of an app. In one embodiment, access outside of an authorized app or software program (e.g., such as accessing using a web browser on the user device) may not be considered an eligible access, yet in other embodiments, it may either be determined to be equivalent or weighted differently. In one embodiment, a determination that the user did not previously access an umbrella account (or a specific umbrella account) may result in returning to consider other criteria (e.g. decision 312) or another determination whether additional criteria is to be considered in the determination of an authentication score, such as a score determined in accordance with one or more embodiments disclosed herein.

Certain embodiments may determine whether at least one access of the umbrella account was via the user device for which provisioning is being requested (e.g., block 318). In one embodiment, a determination that the user accessed the umbrella account on the device for which the provision request is for may result in a $1^{st}$ value to be assigned as a score or sub score (e.g., see block 320). In another embodiment, a determination that the umbrella account was not accessed on that device may prompt further determinations, such as whether there are similarities between the umbrella account access(es) and the current provisioning request (e.g. decision 322). For example, in one embodiment, an identifier of an operating system of a device previously utilized to access the umbrella account may be compared to an identifier of an operating system of the device requesting the provisioning. For example, if the user has accessed the umbrella account only on devices running a first operating system (e.g., iOS), it may be determined whether the device to be provisioned is also operating under the same operating system (and/or same version of the operating system), instead of another operating system (e.g., Android). In one example, if a threshold similarity exists, a score or sub-score may be provided (e.g., see block 324). For example, if the operating system of their current phone is the same as the last mobile device they used, the user may be merely upgrading their phone model or replacing a lost or damaged device, and thus in certain embodiments, a more favorable score is appropriate. In one implementation, a score of sub score (e.g., assigned at block 324) may be less favorable if it is an older version of the same operating system than what was previously utilized.

In one embodiment, the score or sub score (or available range of scores or sub scores) at block 324 may be lower (e.g., less favorable) than the score or sub score (or ranges of the same) at block 320. Yet, in other embodiments, it may be inverse, or they may be weighted similarly. In certain implementations, one or more processes may determine whether the umbrella account was accessed on the same device being provisioned as well as other similarities with other devices that have previously accessed the umbrella account (e.g., both block 320 and 324 may be implemented). In one embodiment, a score or sub score for both may be combined or otherwise considered in the overall determination of a risk score.

In accordance with one embodiment, at least one location factor related to the umbrella account's use may be utilized (see, e.g., block 326). Example location factors, include, but are not limited to: the location of the device requested to be provisioned around the time the request is made (or received), a current location of that device, a location of that or another user device at a point in time that the user accessed the umbrella user account, a current location of another device associated with the user, as well as combinations of these with each other and/or other factors. Although the illustrated embodiment of FIG. 3 shows the determination being made based on an outcome of decision 322, those skilled in the art will appreciate that it may happen before, during, or after that process, and in certain embodiments, block 326 may occur without the implementation of one or more of decisions 316, 318 and 322.

Aspects of this disclosure relate to calculating an authentication score (e.g., block 328 of FIG. 3), which may be calculated based on one or more factors, including those described herein. In one embodiment, scores or sub scores (such as determined or obtained in one or more of blocks 304, 308, 310, 320, 324, and/or 326) may be utilized in the determination of an authentication score. In one embodiment, several sub scores may be weighted to determine the authentication score. In one embodiment, a plurality of umbrella account scores may be utilized. In one example implementation, a cumulative score may be determined from a plurality of related sub scores (e.g., sub scores obtained at blocks 320, 324, and/or 326). One or more sub scores pertaining to an umbrella account or other factor may be utilized individually or in combination. In another embodiment, a single sub-score may be utilized for one or more distinct categories. For example, a most or least favorable score amongst a plurality of related sub-scores may be utilized as a representative sub score in the determination of an overall score.

Authentication scores, such as an authentication score calculated at block 328 of FIG. 3 (and/or another process), may be utilized to determine whether user accounts are or have been properly authenticated. In one embodiment, the authentication score may fail to meet a threshold, and as such, it may be determined that an account should not be authenticated.

Briefly returning to FIG. 2, an authentication score may be determined despite a real-time approval of a provisioning request being transmitted (see, e.g., block 204 and block 206 shown in FIG. 2). In one example implementation, if a resultant authentication score does not meet a threshold (such as determined at decision 208 of FIG. 2), an electronic suspend message may be transmitted (e.g., block 210). In one embodiment, the suspend message may be configured to provide instructions to limit utilization of the device previously approved to be provisioned. In one implementation, one or more digital tokens granted to the device as part of the provisioning process may be retained or otherwise not withdrawn immediately or at all. In one embodiment, the electronic suspend message may instruct an intermediary and/or processing entity to limit utilization of the digital token on the user device without withdrawing the digital token. In certain embodiments, a suspend message may be transmitted to the user device or a device in electronic communication with the user device requested to be provisioned. In one embodiment, "limiting utilization" as a result of the suspend message may prevent any transactions with the digital token. In another embodiment, the suspend message may cause the user device or the device in electronic communication with the user device to delete, mark as revoked, and/or remove the digital token. Yet in another embodiment, transactions may be limited to a certain class or group of vendors, associates, or products. In yet further embodiments, the amount of the transactions (either individually or cumulative) may be limited. Depending on the implementation, the limitation may be a quantity of transactions, a value (such as a quantity of virtual points or currency), combinations thereof, and/or other limitations. One or more of the limitations may be used in conjunction with each other and/or other factors. In addition to transmitting the suspend message, authentication data, such as one or more of the authentication score, sub scores, location data, device data, or combinations thereof may be stored (e.g., block 212). Data may also be stored upon determining the authentication score meets or otherwise satisfies a threshold. In some messages, an electronic signal may be transmitted confirming the approval signal was proper, and thus allowing the provisioned device to remain provisioned and functional with respect to the account at issue. In other embodiments, however, because the approval signal already indicated approval of the provisional request, an affirmative determination that the authentication score meets a threshold (such as at block 208) does not require further transmissions with respect to approval or finalizing the provisioning request. Persons of ordinary skill in the art with the benefit of this disclosure will readily appreciate in certain embodiments, an electronic signal may be transmitted following a determination that the authentication score is above a threshold (such as from an affirmative determination at block 208 of FIG. 2). In one embodiment, a signal may confirm an earlier approval (e.g., the approval signal of block 204). In another embodiment, one of a plurality of messages provides approval or otherwise grants access following determination that an authentication score satisfies a threshold. For example, a first approval message may "increase" or "decrease" the level of approval set forth by an earlier-transmitted approval signal (such as approval signal of block 204). The increase or decrease may unlock or lock certain benefits, options, quantity of transactions, a level of transaction, amongst other possibilities.

Figure 4:
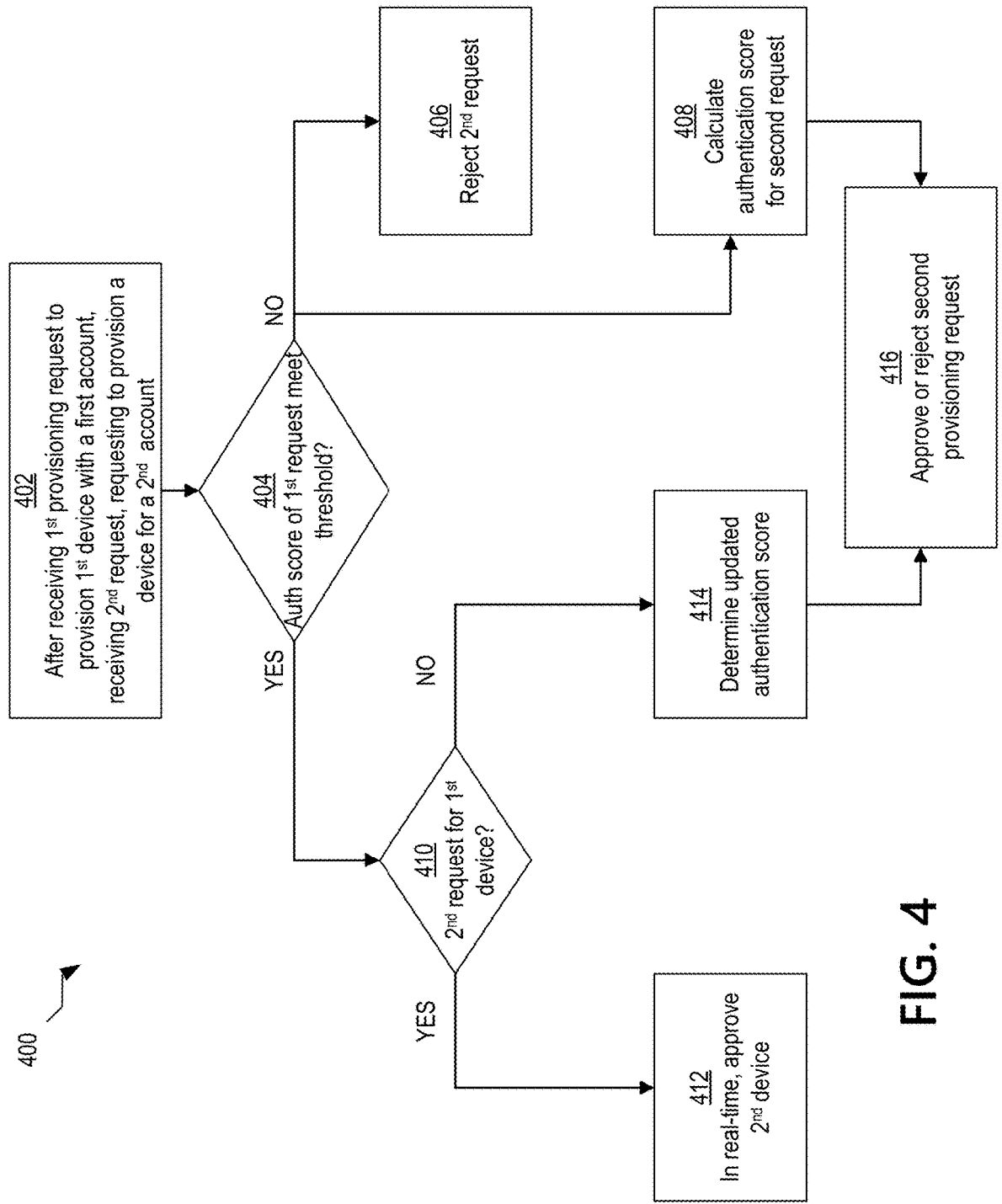
FIG. 4 is a flowchart depicting an example authentication protocol that uses a previously-calculated authentication score in accordance with one or more illustrative aspects discussed herein.

Further aspects of this disclosure relate to handling provisioning requests relating to the same users following a previous determination of an initial provisioning request. FIG. 4 is a flowchart (flowchart 400) depicting an example process for determining authenticity for a provisioning request relating to a user following an initial request. As shown in flowchart 400, a second provisioning request may be received following reception of the $1^{st}$ provisioning request (see block 402 of FIG. 4). The second provisioning request may be received at one or more of the same electronic devices that the first provisioning request was received at, however, it may be received at one or more different devices (e.g., servers). In one embodiment, the second provisioning request differs from the first provisioning request in that it relates to a second user account. For example, the first provisioning request may request authorization to provision a first user device to utilize a first user account, whereas the second provisioning request may request authorization to provision a user device (which may be the first user device or a second user device) to utilize a second account.

Briefly, with regard to the first provisioning request, it may be (but is not required to be) handled in accordance with one or more example processes described herein, such as depicted within FIGS. 2 and 3. In one embodiment, an approval signal configured to instruct the approval of the first provisioning request may be transmitted as well as initiate calculating an authentication score (e.g., as described in various examples with respect to FIGS. 2 and 3). As described above, such actions are optional, may be independent of each other, and are not required to be performed in a serial manner.

In one embodiment in which the $1^{st}$ provisioning request is associated with a calculated authentication score, it may be determined whether that authentication score (and/or sub scores) meets a threshold. Depending on the specific implementation, a threshold may be associated with a score corresponding with approval of the provisioning request (or that approval was proper). In another embodiment, a "less desirable" score still may meet the threshold. In one embodiment, if an authentication score or sub score did not meet a threshold, then the second request may be rejected or otherwise not authorized (e.g., block 406). In certain embodiments, the determination to reject may be done in substantially real-time. In one embodiment, the rejection is determined and transmitted within 5 seconds. In another embodiment, it may be determined and transmitted within 4 seconds.

In certain embodiments, failure of an authentication score or sub score related to the first request to meet a threshold may result in calculating an authentication score for the second request (e.g., block 408). In one embodiment, calculation of an authentication score at block 408 may be conducted in substantially the same manner as the calculation of the authentication score for the first request. Further, multiple thresholds may also be utilized to provide a varied outcome for different scenarios, and the examples provided within FIG. 4 are merely for illustrative purposes. In one embodiment, different thresholds may be utilized for rejecting the second request (e.g., block 406) and calculating an authentication score for the second request (e.g., block 408). In one such embodiment (or other implementations with a single threshold), both blocks 406 and 408 may be implemented.

In certain embodiments, a determination that an authentication score or sub score meets a threshold (e.g., such as at decision 404), may result in one or more outcomes. In one implementation, if the $2^{nd}$ provisioning request is requesting the same device as the first request (however, with respect to a different user account), then the $2^{nd}$ provisioning request may be approved (e.g., block 412). In one embodiment, the approval may be transmitted in substantially real-time. In one embodiment, an approval signal for the second request is transmitted within 5 seconds. In another embodiment, it may be determined and transmitted within 4 seconds. Depending on the implementation, a determination that the $2^{nd}$ provisioning request is not for the $1^{st}$ device, an updated authentication score may be calculated (e.g., block 414). In one embodiment, determining an updated authentication score is different in at least one aspect of the determination of the authentication score for the first request. In one embodiment, if a threshold is met (such as an authentication score or sub score is above a threshold), the determination of the updated authentication score may require less verifications and/or less criteria to be satisfied. In one embodiment, an approval of the provisioning request may be transmitted based on (at least in part) the updated authentication score. In certain embodiments, an electronic suspend message or approval may be transmitted (such as at block 416) based upon an updated authentication score (e.g., the score determined at block 414) or a determination of an authentication score (e.g., the score of block 408).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computerized method for authorizing an electronic device to conduct tokenized transactions, comprising:
   receiving, by a provisioning server, an electronic provisioning request requesting authorization to provision a first user device associated with a user and a first user;
   transmitting, based on receiving the electronic provisioning request, an electronic signal providing an approval signal of the electronic provisioning request within a threshold time, the approval signal configured to authorize a third party to issue a digital token to the first user device authorizing the first user device to digitally utilize the first user account for tokenized transactions, wherein the threshold time is less than five seconds;

initiating, in substantially real-time and by a computer processor, a determination of an authentication score for the provisioning of the first user device, the determination comprising:

calculating, in substantially real-time and by comparing a location associated with the user of the first user device against an origin identifier of the first user device, a first sub score;

calculating, in substantially real-time and by electronically comparing transactions conducted on the first user device after transmitting the approval signal of the electronic provisioning request with transactions conducted prior to the electronic provisioning request, a second sub score;

calculating, in substantially real-time and by determining whether the user has accessed an umbrella user account prior to receiving the electronic provisioning request, wherein the umbrella user account is an account that, once credentials are provided, allows authorized access to one or more accounts, comprising the first user account, a third sub score; and calculating, using a formula based on the first sub score, the second sub score, and the third sub score, the authentication score;

determining, whether the authentication score fails to meet a predetermined threshold; and transmitting, based on determining that the authentication score fails to meet the predetermined threshold, an electronic suspend message to suspend the digital token authorizing the first user device to digitally utilize the first user account for tokenized transactions.

2. The method of claim 1, wherein determining whether the user accessed the umbrella user account comprises determining whether the user accessed the umbrella user account on the first user device prior to the electronic provisioning request.

3. The method of claim 1, wherein it is determined that the user did not access the umbrella user account on the first user device prior to the electronic provisioning request, the method further comprising:

determining, prior to calculating the authentication score, whether to consider additional criteria to calculate the authentication score; and calculating, based on a determination to consider additional criteria to calculate the authentication score, a fourth sub score by comparing an operating system identifier of the first user device to an operating system identifier associated with the user.

4. The method of claim 3, wherein it is determined that the operating system identifier of the first user device does not match the operating system identifier associated with the user, the method further comprising:

analyzing at least one location factor comprising at least one of:
  a location of the first user device upon receiving the electronic provisioning request;
  a current location of the first user device,
  a location of a second user device associated with the user at a point in time that the user accessed the umbrella user account, or
  a current location of the second user device;

assigning, prior to calculating the authentication score, a weighting component to the location factor; and calculating, based, at least in part, on the weighted location factor, the authentication score.

5. The method of claim 1, wherein determining whether the user has accessed the umbrella user account prior to the receiving the electronic provisioning request comprises utilizing only user access conducted via non-cellular networks.

6. The method of claim 1, wherein the location is determined based on the user accessing the umbrella user account at the location using a second user device.

7. The method of claim 1, wherein the location comprises a known permanent address of the user.

8. The method of claim 1, further comprising determining whether an International Mobile Equipment Identity (IMEI) of the first user device matches an IMEI associated with a prior access to the first user account.

9. The method of claim 1, wherein the electronic suspend message causes the first user device to delete the digital token.

10. The method of claim 1, wherein when electronically comparing transactions conducted on the first user device after transmitting the approval signal of the electronic provisioning request with transactions conducted prior to the electronic provisioning request, the transactions conducted prior to the electronic provisioning request were performed on at least one other device associated with the user.

11. The method of claim 1, wherein the threshold time is four seconds.

12. A non-transitory computer-readable medium comprising instructions that, when executed by one or more processors, cause a computing device to perform steps comprising:

receiving an electronic provisioning request requesting authorization to provision a first user device associated with a first user account;

transmitting, based on receiving the electronic provisioning request, an electronic signal providing approval of the electronic provisioning request within a threshold time, the approval signal configured to authorize a third party to issue a digital token to the first user device authorizing the first user device to digitally utilize the first user account for tokenized transactions, wherein the threshold time is less than four seconds;

initiating, in substantially real-time and by a computer processor, a determination of an authentication score for the provisioning of the first user device, the determination comprising:

calculating, in substantially real-time and by comparing a location associated with a user of the first user device against an origin identifier of the first user device, a first sub score;

calculating, in substantially real-time and by determining whether the user has accessed an umbrella user account prior to the receiving the electronic provisioning request, a second sub score; and calculating, using a formula based on the first sub score and the second sub score, the authentication score;

determining, based on a determination that the authentication score satisfies a threshold requirement, not to suspend the first user account;

calculating, by electronically comparing transactions conducted on the first user device after transmitting the approval signal of the electronic provisioning request with transactions conducted prior to the electronic provisioning request on at least one other device associated with the user, a third sub score;

calculating, using a formula based on at least the third sub score and authentication score, an updated authentication score;

determining that the updated authentication score fails to satisfy a threshold requirement; and transmitting, based on the determining, an electronic suspend message to instruct limiting utilization of the digital token on the first user device to digitally utilize the first user account for tokenized transactions.

13. The non-transitory computer-readable medium of claim 12, wherein the location is determined from a source other than the first user device.

14. The non-transitory computer-readable medium of claim 13, wherein the location is determined based on the user accessing with the umbrella user account at the location using a second user device.

15. The non-transitory computer-readable medium of claim 12, wherein the location comprises a known permanent address of the user.

16. A computing device comprising:
at least one processor; and
a non-transitory computer-readable medium comprising computer-executable instructions that, when executed, cause the computing device to:
 receive an electronic provisioning request requesting authorization to provision a first user account associated with a user on a first user device;
 transmit an electronic signal providing approval of the electronic provisioning request, the approval signal configured to authorize a third party to issue a digital token to the first user device authorizing the first user device to digitally utilize the first user account;
 initiate, in substantially real-time and by a computer processor, a determination of an authentication score for the provisioning of the first user account on the first user device by:
  calculating, in substantially real-time and by comparing a location associated with the user of the first user device against an origin identifier of the first user device, a first sub score;
  calculating, in substantially real-time and by electronically comparing transactions conducted on the first user device after transmitting the approval signal of the electronic provisioning request with transactions conducted prior to the electronic provisioning request on at least one other device associated with the user, a second sub score;
  calculating, in substantially real-time and by determining whether the user has accessed an umbrella user account prior to the receiving the electronic provisioning request, a third sub score; and
  calculating, using a formula based on the first sub score, the second sub score, and the third sub score, the authentication score;
 determine, based on a determination that the authentication score satisfies a threshold requirement, that the approval was proper;
 receive a second electronic provisioning request requesting authorization to provision a second user account associated with the user;
 determine, within five seconds of receiving the second electronic provisioning request and based on the authentication score, whether the second electronic provisioning request is for provisioning the first user device; and
 transmit, based on determining that the electronic provisioning request is for provisioning the first user device, an electronic signal providing approval of the second electronic provisioning request for provisioning the first user device.

17. The computing device of claim 16, wherein the non-transitory computer-readable medium further comprises computer-executable instructions that when executed by the processor cause the computing device to:
 receive a third electronic provisioning request requesting authorization to provision the second user account associated with the user;
 determine that the third electronic provisioning request is requesting authorization to provision a second user account on a second user device;
 calculate, by comparing a location associated with the user of the second user device against an origin identifier of the second user device, a fourth sub score;
 calculate, using a formula based on at least the fourth sub score, the authentication score; and
 provide, based on a determination that the authentication score satisfies a threshold requirement, an approval signal of the third electronic provisioning request.

18. The computing device of claim 17, wherein the approval signal of the third electronic provisioning request is done in real time.

19. The computing device of claim 17, wherein the non-transitory computer-readable medium further comprises computer-executable instructions that when executed by the processor cause the computing device to:
 receive a fourth electronic provisioning request to authorization to provision a second user account associated with the user;
 determine that the fourth electronic provisioning request is requesting authorization to provision a second user account on a second user device;
 recalculate, by comparing a location associated with the user of the second user device against an origin identifier of the second user device, the fourth sub score;
 recalculate, using a formula based on at least the fourth sub score, the authentication score; and
 transmit, based on determining that the authentication score does not meet a threshold requirement, an electronic suspend message configured to provide instructions to limit utilization of the digital token on the first user device.

20. The computing device of claim 16, wherein the approval of the second electronic provisioning request is done in real time.

* * * * *